United States Patent [19]
Paramonoff et al.

[11] 3,871,233
[45] Mar. 18, 1975

[54] FLUID PRESSURE MONITORING DEVICE

[75] Inventors: Elpidifor Paramonoff, Los Angeles; Frederick C. Olsen, Huntington Beach, both of Calif.

[73] Assignee: Standun, Inc., Compton, Calif.

[22] Filed: Sept. 17, 1973

[21] Appl. No.: 397,613

[52] U.S. Cl. ................................. 73/389, 73/419
[51] Int. Cl. ............................................. G01l 7/16
[58] Field of Search............ 73/419, 389; 200/83 W, 200/82 C

[56] References Cited
UNITED STATES PATENTS
2,843,077  7/1958  Leefer.................................. 73/419

*Primary Examiner*—Donald O. Woodiel
*Attorney, Agent, or Firm*—Mahoney, Schick & Cislo

[57] ABSTRACT

Pressurized operating fluid, such as oil for hydrostatic fluid bearings, is directed into a chamber against a plunger urging the plunger into a first position. A monitoring pressure force slightly less than the force of the operating fluid when the operating fluid is at a minimum working pressure is exerted against the plunger tending to move the plunger from this first to a second position. Thus, when the pressure of the operating fluid drops below the minimum working pressure, the plunger is moved to its second position and such movement is sensed, thereby sensing the malfunction.

8 Claims, 9 Drawing Figures

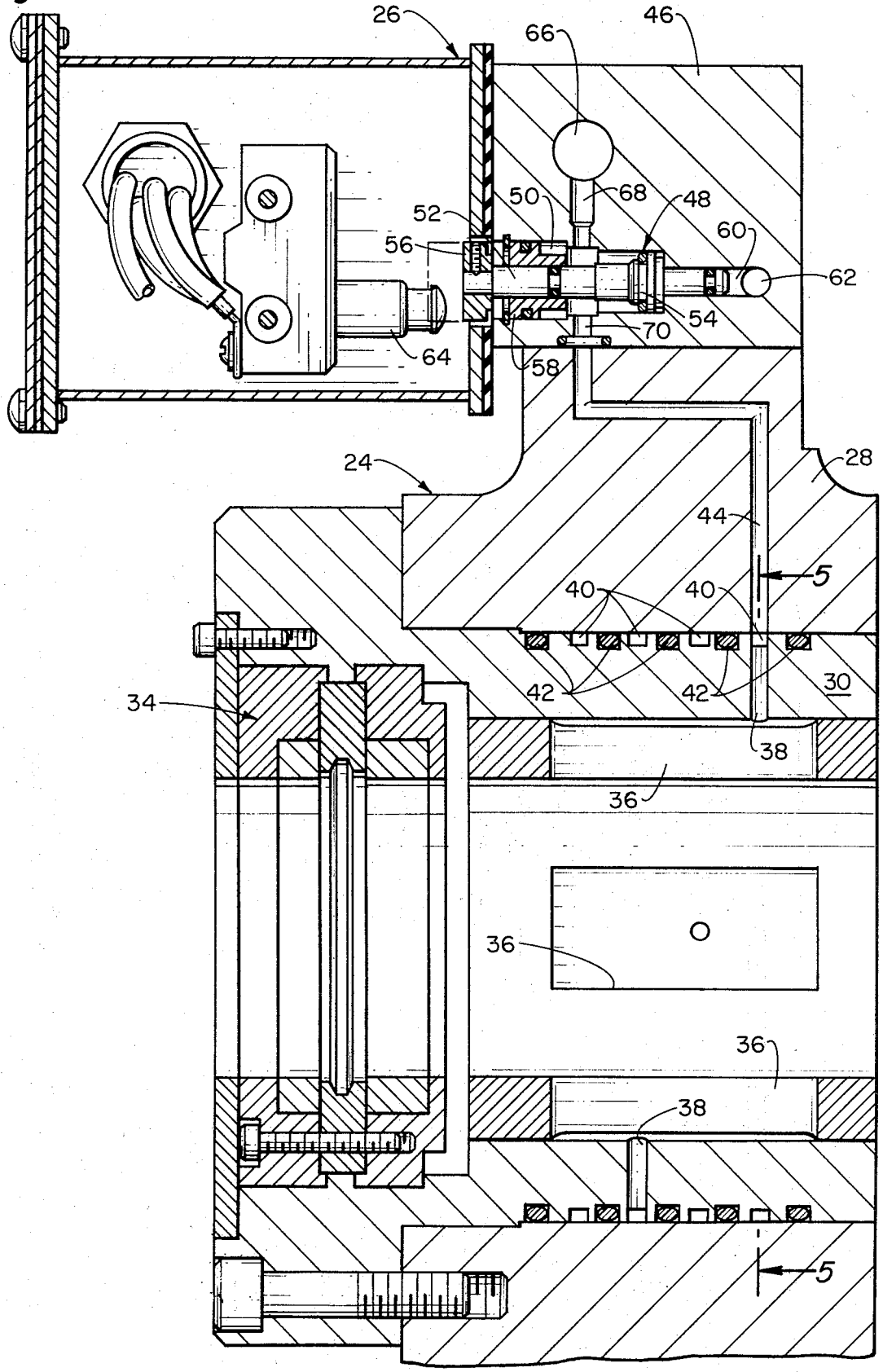

FLUID PRESSURE MONITORING DEVICE

BACKGROUND OF THE INVENTION

This invention relates to a fluid pressure monitoring device for mechanisms such as hydrostatic fluid bearings and more particularly, to a fluid pressure monitoring device for use in conjunction with pressurized fluid lines which monitoring device constantly monitors the pressure of the fluid in the line and senses any decrease in such pressure below a predetermined minimum level. Furthermore, the device is adaptable for various forms of sensing arrangements, such as mechanically actuated switches, proximity sensors and auxiliary fluid flow detectors, any of which may be arranged to interrupt the operation of a machine when the decrease in fluid pressure to a vital component is sensed or detected therein. Still further, due to the unique arrangement of the fluid pressure monitoring device of the present invention, the same may also be adapted for mounting portions thereof on moving machine parts operating in coordination with portions thereof on stationary machine parts while still maintaining an efficient and positive fluid pressure monitoring operation.

There are many instances in modern, high speed, production and other types of machines wherein many of the vital working components and/or control components thereof are actuated and operably maintained functional by pressurized fluid, whether liquid fluids such as oil or gaseous fluids such as air. In many cases, a supply of the pressurized fluid is absolutely required to a vital component of the machine in order for that component to perform its intended function and if such pressurized fluid supply is even momentarily interrupted, that particular component requiring such supply can be severely damaged or, at least, will malfunction so as to effect overall operation of the machine resulting in a major machine malfunction. Although, upon minor consideration, this may appear to be a relatively inconsequential problem, it is pointed out that with the extremely high speeds of modern machinery and the multiplicity of uses of fluid pressure for functional operation and controls, it can be seen that a relatively remote fluid pressure failure which may not be immediately easily detected can be the cause of expensive repairs and a serious loss of production time.

Prime instances of just such possible serious malfunctioning situations from an interruption of fluid pressure are clearly illustrated in U.S. Pat. No. 3,735,629, dated May 29, 1973, and entitled "Apparatus For Forming One-Piece Metallic Can Bodies". Briefly, the apparatus disclosed in said patent includes a horizontally reciprocal ram which successively engages each of a series of shallow drawn aluminum or tin plate cups forcing the same through a series of dies to ultimately produce relatively deep, final one-piece can bodies used as containers for merchandising various forms of liquids for human consumption. The speed of operation of the apparatus is extremely high, in the order of 150 to 175 reciprocal strokes of the ram per minute.

More important to the principles of the present invention, the high-speed reciprocal movements of the ram in such apparatus are produced by securing the ram to a reciprocal carriage which is, in turn, movably supported on the particular machine by a multiplicity of hydrostatic oil bearings. Each of the multiplicity of carriage oil bearings is comprised of a preferably circular oil bearing pad on the movable carriage acting against a stationary flat surface on slides of the machine with constantly pressurized and constantly flowing oil being emitted from the oil bearing pad against the slide surface creating a constantly flowing oil thickness between each pad and the flat slide surfaces.

Oil bearing pad and slide surfaces are positioned so that the ram carriage is stabilized in all directions as well as horizontally movable. It can be seen that such stabilizing for counteracting a multiplicity of forces is quite important, particularly in view of the fact that the ram is secured to the carriage in cantilever fashion so that the oil bearings are required to not only support the carriage and the ram during the high-speed movement, but also to counteract the varying forces resulting from this ram cantilever mounting during such movement, all of which must be maintained with extreme accuracy. Furthermore, with the carriage and ram constantly moving in the required reciprocal strokes and the fact that the hydrostatic oil bearings each require a constantly flowing supply of oil thereto for functioning, the constantly flowing oil supplies to the individual carriage oil bearing pads must be through flexible conduits even further increasing the overall possibility of difficulties from pressurized oil supply malfunctions.

Despite all of the foregoing, however, it can be seen that the failure of functioning of any one of the many carriage hydrostatic oil bearings can result in serious consequences. Whether the particullar hydrostatic oil bearing is for purposes of support or for purposes of stabilization and alignment, failure of the pressurized oil supply thereto can immediately not only cause misalignments in the carriage and ram movements, but can permit direct contact between the moving carriage oil bearing pads and the stationary slides involving serious injury to the respective parts and the expense of replacement thereof. It is vital, therefore, that the pressurized oil supplies to the moving carriage oil bearing pads be constantly monitored and upon the initial failure of any one of these pressurized oil supplies, the machine be quickly stopped before serious damages can occur.

In addition to the above described support for the moving ram of the machine, a hydrostatic oil bearing sleeve is provided forwardly of the ram carriage path of movement and within which a portion of the moving ram is always supported. This hydrostatic oil bearing sleeve mounted stationary on the machine includes four axial slots radially therethrough spaced circumferentially equidistant about the ram periphery. Again, pressurized oil is directed through these sleeve slots and against the ram periphery creating constantly flowing hydrostatic oil thicknesses between the ram and sleeve.

The hydrostatic oil bearing sleeve, therefore, in effect comprises four peripherally acting hydrostatic oil bearings and by proper pressurized oil supply to each of these bearings, the moving ram may be supported intermediate its length and maintained in proper desired alignment necessary for proper machine functioning. Furthermore, failure of the proper pressurized oil supply to any one of these oil bearings can again very quickly cause misalignments of the ram and possible serious damages. For these reasons, constant monitoring of the pressurized oil supplies to the hydrostatic oil bearing sleeve is highly desirable so that the machine can be immediately stopped in the event of a detected malfunction.

OBJECTS AND SUMMARY OF THE INVENTION

It is, therefore, an object of this invention to provide a fluid pressure monitoring device for mechanisms such as hydrostatic fluid bearings wherein the monitoring device is actuated to directly and constantly compare the pressure force of a main working fluid to a predetermined minimum permissible pressure force, and when the pressure force of the main working fluid drops below the predetermined minimum permissible pressure force, to automatically sense or detect such condition. In this manner, the mechanism or machine may be constantly guarded against malfunctions resulting from the lack of a required fluid pressure and thereby guarded against possible serious damage which can result from such malfunctioning, as well as the possibility of the manufacture of improperly formed production parts. Thus, as an example, in the case of mechanisms or machines making use of hydrostatic fluid bearing, the pressurized oil flow to and required by such hydrostatic fluid bearings may be constantly monitored and in the event of a flow failure being detected, the machine may be quickly automatically stopped, in most cases, prior to any appreciable machine damage or improperly manufactured production parts.

It is a further object of this invention to provide a fluid pressure monitoring device for mechanisms such as hydrostatic fluid bearings of the foregoing type which is adaptable for making use of any one of a plurality of sensing systems for the detection of the failure of the fluid pressure in a fluid pressure line while still making use of the same basic fluid pressure monitoring mechanism. According to the principles of the present invention, all forms of the fluid pressure monitoring device preferably make use of a monitoring mechanism including a reciprocal plunger which is normally urged to and maintained at a first position as a result of contact by properly pressurized fluid at a pressure above a predetermined minimum permissible pressure, but which plunger is, at the same time, constantly urged toward a second position by a monitoring pressure force of a magnitude which results in the plunger moving toward its second position when the pressure of the pressurized fluid drops below its minimum permissible pressure. Thus, the sensing function is one of sensing or detecting the plunger movement from its first to its second position and this can be accomplished by arranging the plunger for direct contact in such movement against a mechanically actuated switch, or by sensing such plunger movement by a usual proximity sensor, or by sensing such plunger movement through auxiliary fluid flow detectors, all of which will be hereinafter discussed more in detail.

It is still a further object of this invention to provide a fluid pressure monitoring device for mechanisms such as hydrostatic fluid bearings of the foregoing type and presenting the previously discussed advantageous features which is further adaptable for fluid pressure monitoring applications wherein the fluid pressure monitoring and sensing components thereof may be mounted either both stationary or one movable relative to the other. For maximum effectiveness of the fluid pressure monitoring device, it is obvious that the same should be mounted as closely as possible to the particular machine element utimately receiving the pressurized fluid and it is particularly vital where the machine element is a moving machine element that the fluid pressure monitoring portion of the monitoring device will be movable therewith in view of the high incidence of failure of fluid pressure supplying lines to such moving machine elements which can result in a failure of pressurized fluid supply. With the fluid pressure monitoring device of the present invention, it is a simple matter to mount the monitoring portion thereof directly on the moving machine element being supplied with the pressurized fluid and to mount the sensing or detecting portion thereof at a stationary location adjacent the path of movement of the monitoring portion during the machine element movement. Thus, every time that the monitoring portion of the device passes the sensing portion thereof, any loss of fluid pressure being monitored may be quickly detected.

BRIEF DESCRIPTION OF THE DRAWING:

FIG. 4 is a fragmentary, vertical sectional view looking in the direction of the arrows 4—4 in FIG. 3;

DESCRIPTION OF THE BEST EMBODIMENTS CONTEMPLATED

The principles of the fluid pressure monitoring device for mechanisms of the present invention are applicable to many uses where fluid pressure monitoring and consequent immediate sensing or detection of fluid pressure failure, and in some cases failure of fluid flow, is of importance. Through the immediate sensing and detection of fluid pressure failure and/or fluid flow failure, it is possible to prevent many of the usual results of machine malfunctions by immediately stopping the operationn thereof and the correction of the particular malfunction. As illustrated and described herein, one vital application of the principles of the fluid pressure monitoring device of the present invention is in conjunction with the oil flow to hydrostatic fluid bearings in certain forms of metallic can making machinery.

Figure 1:
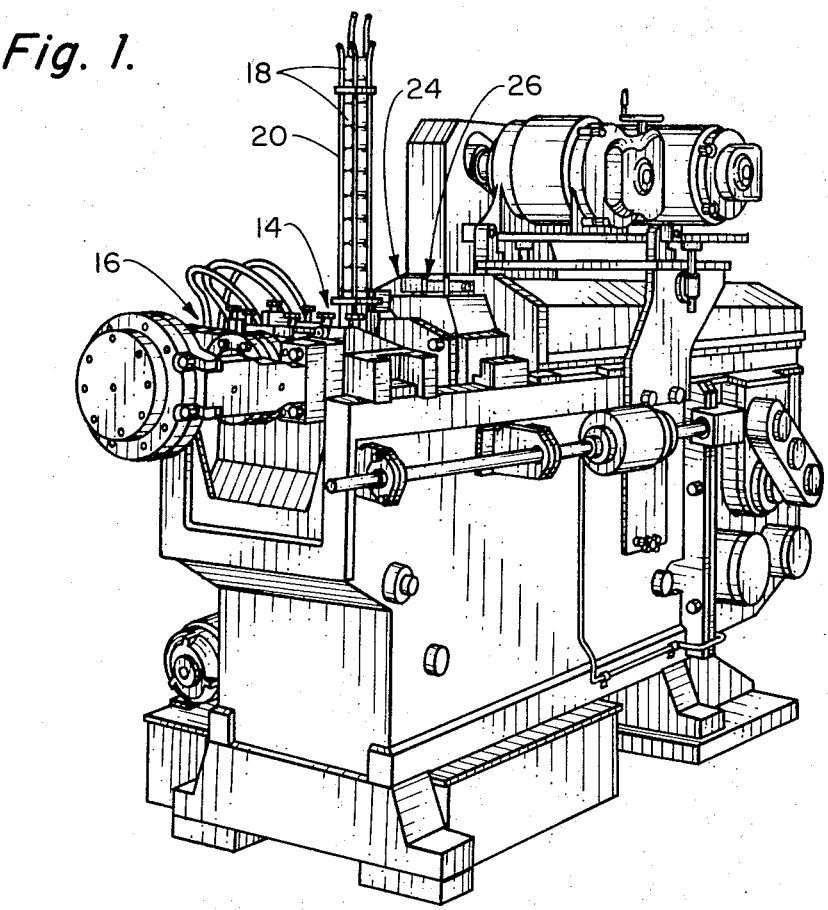
FIG. 1 is a perspective view of a metallic can body former incorporating therein fluid pressure monitoring devices according to the principles of the present invention.
Figure 2:
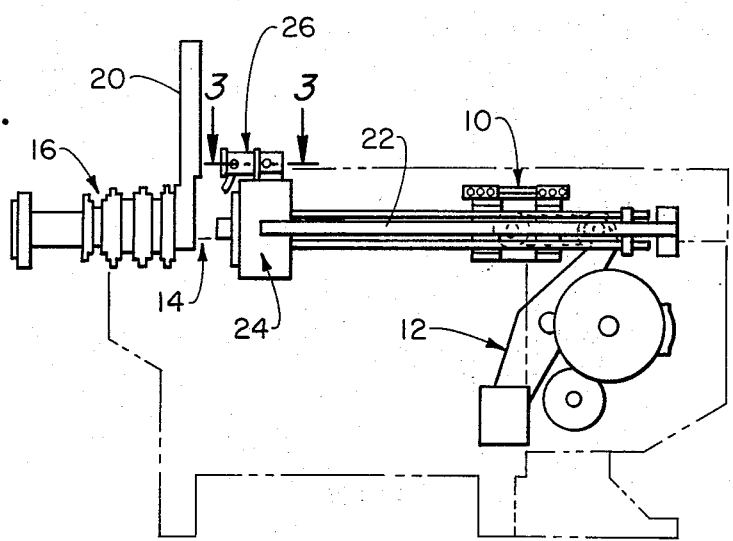
FIG. 2 is a schematic view of the metallic can body former of FIG. 1 for ease of description and understanding.

Referring to FIGS. 1 and 2 of the drawings, a metallic can bodymaker is shown basically of a form illustrated and described in U.S. Pat. No. 3,735,629, issued May 29, 1973, and entitled "Apparatus For Forming One-Piece Metallic Can Bodies". Briefly, this bodymaker includes an elongated, generally cylindrical, horizontally reciprocally driven ram (not shown) which is secured in cantilever fashion extending horizontally from a ram carriage generally indicated at 10 which is reciprocally driven by drive mechanism generally indicated at 12 to move the ram forwardly through a feed station generally indicated at 14 followed by a die pack generally indicated at 16 and back to its starting position. During the movement of the ram through the feed station 14, the ram engages the leading of a series of shallow drawn metallic cups 18 received from a feed track 20 and forces the cup through the die pack 16 during which the cup is formed into a final one-piece metallic can body to be later used as a container for liquids and the like.

More important to the principles of the present invention, the ram carriage 10 and the ram reciprocate at at extremely high speeds, in the order of 150 to 175 reciprocations per minute, and the ram carriage is horizontally movably supported by a series of hydrostatic oil bearings giving the carriage and ram both horizontal and vertical stability while maintaining necessary alignment under these high speed conditions. As partially shown in FIG. 2 and fully described and illustrated in said patent, the various hydrostatic oil bearings for the ram carriage 10 are comprised of oil bearing pads (not shown) acting against surfaces of stationary oil bearing slides 22, the moving carriage pads each having a constant flow of pressurized oil from a central portion thereof against the slides so as to produce a constantly flowing layer of oil movably supporting the carriage on the slides.

Figure 5:
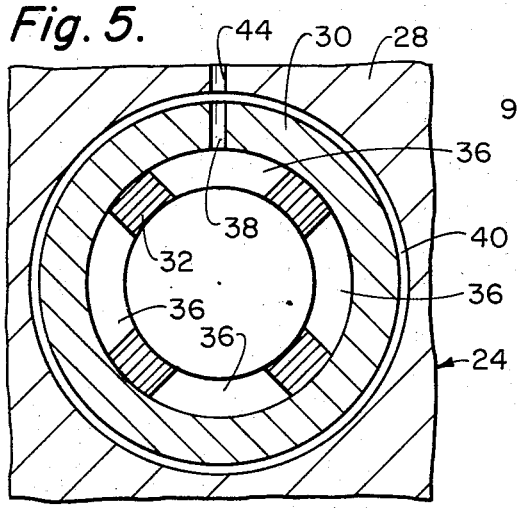
FIG. 5 is a reduced, fragmentary, vertical sectional view looking in the direction of the arrows 5—5 in FIG. 4.

In addition, spaced forwardly of the path of travel of the ram carriage 10 and adjacent the feed station 14, the ram is horizontally reciprocally received through a stationary hydrostatic oil bearing sleeve assembly generally indicated at 24, shown more in detail in FIGS. 4 and 5. The general purpose of the hydrostatic oil bearing sleeve assembly 24 is to additionally support the elongated ram as closely as possible to the feed station 14 and the die pack 16 in view of the fact that the ram is extending in cantilever fashion from the ram carriage 10 and requires further support in order to maintain proper alignment with the feed station and die pack. Although the fluid pressure monitoring device principles of the present invention have ready application as to oil pressure flow monitoring at the ram carriage 10 as will be hereinafter further described, for simplicity purposes, the fluid pressure monitoring device principles of the present invention are described and shown in conjunction with the hydrostatic oil bearing sleeve assembly 24 embodied in a fluid pressure monitoring assembly generally indicated at 26 overlying and secured to the hydrostatic oil bearing sleeve assembly 24 as shown generally in FIGS. 1 and 2 and in detail in FIGS. 3 through 5.

The hydrostatic oil bearing sleeve assembly 24 is comprised of an annular outer mounting sleeve 28 telescoping an annular oil distribution sleeve 30 which, in turn, telescopes and mounts an annular bearing sleeve 32, as well as an annular wiper sleeve assembly generally indicated at 34 forwardly axially adjacent the bearing sleeve. The bearing sleeve 32 is formed with four equally circumferentially spaced and axially extending oil bearing slots 36 extending totally radially therethrough. Each of the oil bearing slots 36 is separately supplied with pressurized oil from outwardly thereof by a separate one of a series of four oil inlets 38 radially through the oil distribution sleeve 30 and each outwardly communicating with a separate one of a series of four annular oil distribution channels 40 axially spaced in the periphery of the oil distributor sleeve 30.

The oil distributor channels 40 are radially outwardly closed by the mounting sleeve 28 and are separated by seals 42 to prevent pressurized oil leakage along the periphery of the oil distribution sleeve 30. Each of the oil distribution channels 40 is, in turn, supplied with oil by a separate one of a series of four oil inlets 44, one of which is shown in FIGS. 4 and 5. All of the oil inlets 44 communicate outwardly at spaced locations through the mounting sleeve 28 and through the periphery thereof thereby each supplying its respective oil distribution channel 40.

Figure 3:
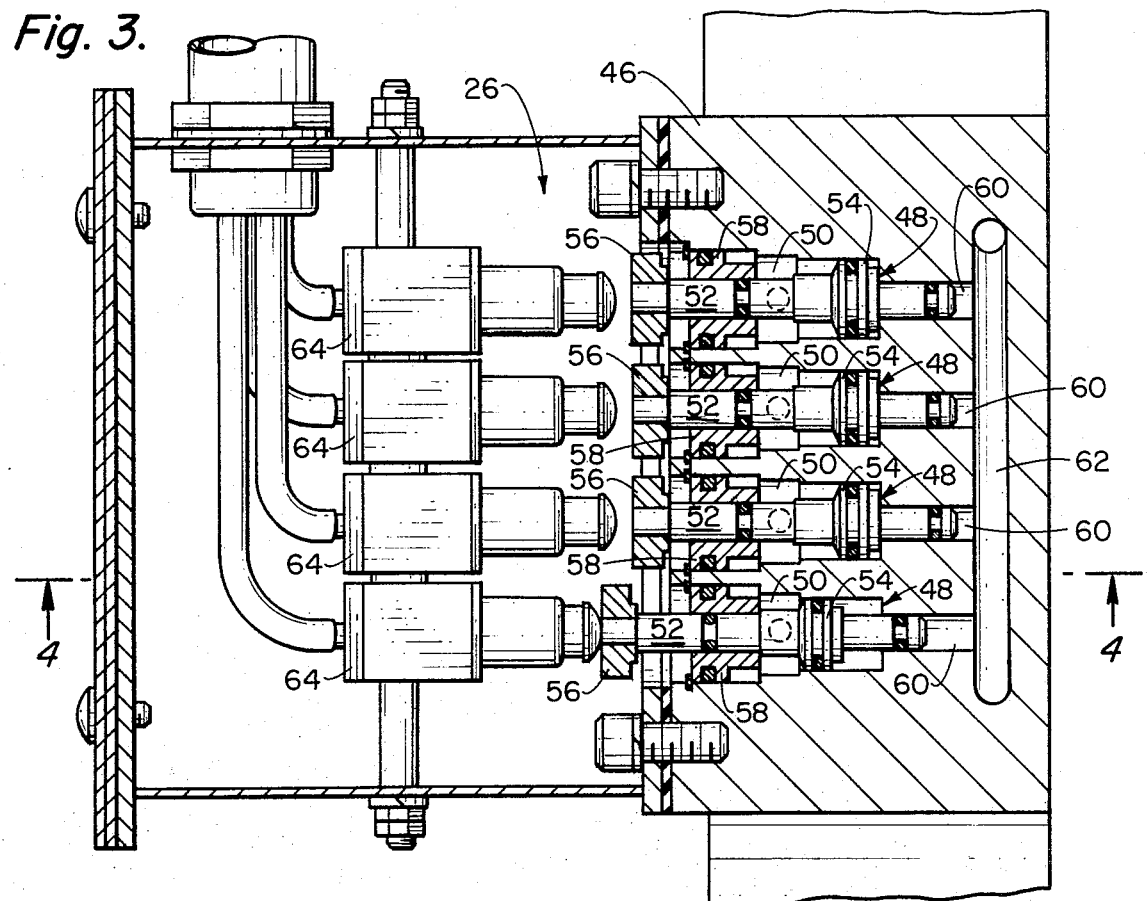
FIG. 3 is an enlarged, fragmentary, horizontal sectional view looking in the direction of the arrows 3—3 in FIG. 2 and illustrating a series of the fluid pressure monitoring devices of the present invention constructed according to one of the preferred forms thereof.

As shown in FIGS. 3 and 4, the fluid pressure monitoring assembly 26 includes a housing member 46 secured downwardly on the periphery of the mounting sleeve 28 and this housing member 46 forms the individual housing members for a series of four generally identical fluid pressure monitoring devices generally indicated at 48. Each of the fluid pressure monitoring devices 48 is comprised of the housing member 46 having a stepped main fluid chamber 50 formed therein, a reciprocal plunger 52 being received in the main fluid chamber 50. In this particular form of the fluid pressure monitoring devices 48, each of the plungers 52 is formed with a piston 54 spaced from the plunger right end as viewed and terminates at the left end in an enlarged head 56, the plunger being guided intermediate the piston and head by a guide sleeve 58 secured in the main fluid chamber 50.

Still as viewed in FIGS. 3 and 4, the right ends of the main fluid chambers 50 are each connected through monitoring pressure means in the form of individual system pressure inlets 60, each communicating with a common system pressure header 62, The right ends of the plungers 52 are received reciprocal within their respective system pressure inlets 60 so that system pressurized fluid, which may be either pressurized oil or air, received from the system pressure header tends to urge the plungers from their first positions to the right of the main fluid chambers 50 toward second positions to the left thereof. Furthermore, a series of four sensing switches 64 are secured spaced from the housing member 46, one generally axially aligned with each of the plungers 52, the sensing switches being spaced from the plunger heads 56 when the plungers are in their first positions to the right and the sensing switches being engaged by and actuated by being depressed by the plunger heads when the plungers are moved from their first positions toward and to their second positions.

As best seen in FIG. 4, a bearing oil supply header 66 is formed in the housing member 46 communicating with a series of four spaced bearing oil inlets 68, one to each of the monitoring device main fluid chambers 50 communicating into these chambers through the left of the plunger pistons 54. Individual bearing oil outlets 70 are formed in the housing member 46 communciating into the respective monitoring device main fluid chambers 50 to the left of the plunger pistons 54 and communicating downwardly through the periphery of the housing member 46, one aligned with an opening into each of the separate oil inlets 44 of the mounting sleeve 28. Appropriate seals are provided for the various fluid pressure monitoring devices 48 to isolate the pressurized fluids of the system pressure header 62 and the bearing oil supply header 66 during monitoring and during reciprocation of the various plungers 52.

In overall assembly, therefore, each of the four oil bearing slots 36 making up a separate hydrostatic oil bearing of the oil bearing sleeve 32 is normally supplied with properly pressurized oil above a predetermined minimum operating pressure through one of the fluid pressure monitoring devices 48 and as long as this constantly flowing bearing oil through each of the fluid pressure monitoring devices is at or above this predetermined minimum operating pressure it will exert at least a minimum total pressure force against each of the monitoring device plungers 52 urging and retaining these plungers in their first positions, to the right as shown in FIGS. 3 and 4. Furthermore, during this normal operation, a constant system pressure, which may be pressurized oil or air taken from the main machine fluid system, is directed against each of the monitoring device plungers 52 within the system pressure inlets 60 exerting total pressure forces against each of the plungers tending to move them to the left from their normal operating positions and this system total pressure force against the monitoring device plungers is predetermined so as to be slightly below the minimum total pressure force exerted by the pressurized bearing oil. The result is that one of the fluid pressure monitoring devices 48 is constantly monitoring the pressure of the pressurized bearing oil constantly flowing to each of the hydrostatic oil bearings formed by the oil bearing slots 36 of the oil bearing sleeve 32 and as long as the pressurized oil to each of these hydrostatic oil bearings is retained at a pressure above a predetermined minimum operating pressure, the monitoring device plungers 52 will be retained to the right as shown. When, however, this pressurized bearing oil to any one of the hydrostatic oil bearings drops below the predetermined minimum operating pressure, the constantly monitoring system fluid at constant system fluid pressure will urge that particular monitoring device plunger 52 from its first position to the right toward its second position to the left causing that plunger head 56 to engage and actuate its respective sensing switch 64 which is electrically connected to the main machine operating electrical system and will shut down operation of the machine.

As viewed in FIG. 3, three of the fluid pressure monitoring devices 48 have the plungers 52 thereof in their first positions indicating that pressurized bearing oil to three of the hydrostatic fluid bearings was at a proper operating pressure above the predetermined minimum operating pressure. The plunger 52 of the fourth fluid pressure monitoring device, however, has been moved from its first position to its second position by the constantly monitoring system pressurized fluid indicating that the pressurized oil to that particular hydrostatic oil bearing had dropped below the predetermined minimum operating pressure causing a malfunction and the plunger head 56 contacting and depressing the particular sensing switch 64 has shut down the machine. In FIG. 4, the monitoring device plunger 52 is shown in its first position in full lines and its second position in phantom lines.

Figure 6:
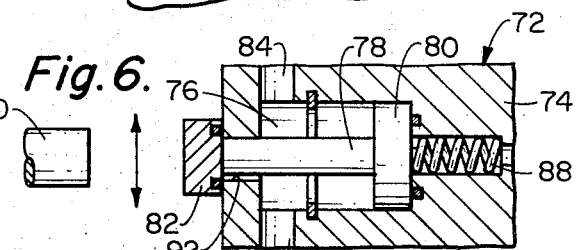
FIG. 6 is a fragmentary, vertical section view of an alternate form of a fluid pressure monitoring device according to certain of the principles of the present invention, the device being shown in normal pressurized fluid monitoring condition.
Figure 7:
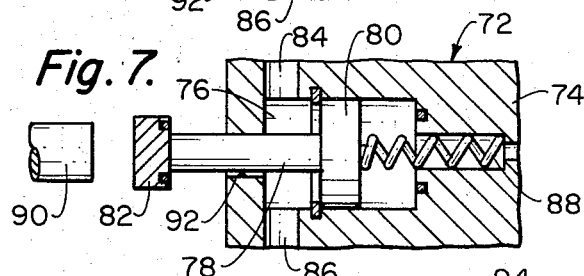
FIG. 7 is a view similar to FIG. 6 and showing the fluid pressure monitoring device in pressure failure sensing or detecting condition.

An alternate form of fluid pressure monitoring device generally indicated at 72 is shown in FIG. 6 and includes a housing member 74 forming a main fluid chamber 76 within which is reciprocally mounted a plunger 78 comprised of a piston 80 and a head 82. Pressurized operating fluid is admitted into the main fluid chamber 76 acting against the plunger piston 80 through a fluid inlet 84 and exits from the main fluid chamber through a fluid outlet 86. The monitoring pressure against the plunger 78 is applied by a compression spring 88 closely precalculated to serve the function hereinbefore described. The sensing means is in the form of a well-known proximity sensor 90 which will not sense the plunger head 82 when the plunger 78 is in its first position as shown in FIG. 6, but will sense the plunger head when the plunger is moved to its second position as shown in FIG. 7, the proximity sensor 90 being electrically connected in usual manner for performing a designated function such as shutting down a machine when the plunger head is sensed.

Thus, as in the first form, this second or alternate form of fluid pressure monitoring device 72 will constantly monitor the pressure of pressurized fluid, such as the pressurized bearing oil, constantly flowing through the main fluid chamber 76 and if the pressure thereof drops below a predetermined minimum operating pressure, the compression spring 88 will overcome the pressurized fluid force against the plunger 78 causing the plunger to move from its normal first position shown in FIG. 6 to its second position shown in FIG. 7 which plunger movement will be sensed by the proximity sensor 90 and this detection of malfunction may be appropriately used. In this alternate form of FIGS. 6 and 7, however, an additional element is added in the form of a by-pass channel 92 adjacent the plunger 78 through the housing member 74 from the main fluid chamber 76. As can be seen from FIGS. 6 and 7, the by-pass channel 92 is normally retained closed by the plunger head 82 as long as the plunger 78 remains in its normal first position, but as soon as the plunger 78 begins movement from its normal first position as shown in FIG. 6 to its second position shown in FIG. 7, the by-pass channel 92 is opened permitting the further exhaust of pressurized operating fluid from the main fluid chamber 76 and thereby further reducing the pressure therein. This by-pass channel 92, therefore, as soon as a low pressure operating fluid malfunction is begun to be detected by the fluid pressure monitoring device 72, drops the pressure of the operating fluid within the main fluid chamber 76 even further so as to prevent repeatedly reversing reciprocating movement of the plunger 78 or "hunting" by the plunger which could disturb a positive sensing of malfunction by the device.

With the provision of the by-pass channel 92 in this particular alternate form, however, with the monitoring pressure being applied by the spring 88 and always tending to urge the plunger 78 toward the second position or to the left as shown, mere admission of operating fluid into the main fluid chamber 76 against the plunger piston 80 may not move the plunger 78 to its first position or to the right even at full operating pressure since the by-pass channel 92 is open. To start in such event, it is merely necessary to manually position the plunger 78 into its first position upon the operating fluid being admitted, thereby closing the by-pass channel 92 and maintaining full operating fluid pressure against the plunger 78.

Figure 8:
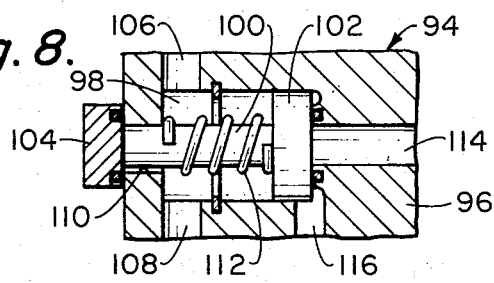
FIG. 8 is a fragmentary, vertical sectional view of another alternate form of fluid pressure monitoring device according to certain of the principles of the present invention, the device being shown in normal pressure fluid monitoring condition; and, FIG. 9 is a view similar to FIG. 8 and with the fluid pressure monitoring device in pressure failure sensing or detecting condition.
Figure 9:
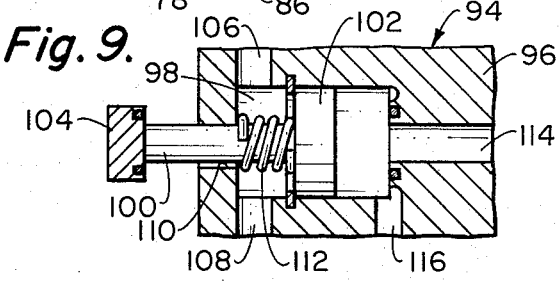

A still further alternate construction in the form of a fluid pressure monitoring device 94 is shown in FIGS. 8 and 9 similarly including a housing member 96 forming a main fluid chamber 98 within which is mounted a plunger 100 comprised of a piston 102 and a head 104. Pressurized working fluid is admitted into the main fluid chamber 98 through a fluid inlet 106 and exits therefrom through a fluid outlet 108. Furthermore, as in the alternate form of FIGS. 6 and 7, this fluid pressure monitoring device 94 includes a by-pass channel 110 functioning in the same manner previously described for more accurate and positive sensing of a low pressure condition.

This fluid pressure monitoring device 94 additionally includes a compression spring 112 acting against the plunger 100 tending to urge the plunger toward its normal first position so that the normal total pressure force acting against the plunger for retaining it in its first position as shown in FIG. 8 is made up partially of the pressure exerted by the pressurized operating fluid constantly flowing through the main fluid chamber 98 and partially by the spring 112. Still further, the monitoring pressure means of this form is made up by a monitoring fluid inlet 114 communicating through the housing member 96 into the main fluid chamber 98 against the plunger piston 102 tending to force the plunger 100 toward its second position and a monitoring fluid outlet 116 outwardly through the housing member from the main fluid chamber adjacent the monitoring fluid inlet. When the plunger 100 is in its normal first position, it seals off the monitoring fluid inlet 114 into the main fluid chamber 98 so that constant pressure fluid directed into the monitoring fluid inlet 114 will accomplish the monitoring function, but upon the plunger 100 moving toward its second position from the position of FIG. 8 to the position of FIG. 9, the constant pressure monitoring fluid will flow through the main fluid chamber 98 from the monitoring fluid inlet 114 through the monitoring fluid outlet 116 and can be sensed by a usual fluid flow sensing device.

Either of these latter two fluid pressure monitoring devices 72 or 94 could be readily adapted for identical use to that of the first described fluid pressure monitoring devices 48. Any one of the three, however, could be likewise adapted for use in monitoring pressurized oil flow to each of the hydrostatic oil bearings for the ram carriage 10 described above. In the case of the ram carriage 10, however, it would be preferred to mount the housing members with their reciprocal pistons directly on the reciprocally moving ram carriage so that the sensing means in the forms of the sensing switches 64 of FIGS. 3 and 4 or the proximity sensors 90 of FIGS. 6 and 7 would be mounted stationary adjacent the path of movement of the plunger heads and be capable of sensing function only during momentary approximate alignment.

The principles of the present invention may likewise be adapted for fluid pressure monitoring of various other types which would require little modification to the various fluid pressure monitoring devices 48, 72 or 94 above described. For instance, all of these fluid pressure monitoring devices described monitor the pressure of fluid constantly flowing through the housing members thereof and any one of these devices would equally effectively monitor the pressure of fluids which are merely directed into the housing members thereof without constant flow therethrough. The principles would be generally the same and the monitoring would be equally effective as is obvious to those skilled in the art.

According to the principles of the present invention, therefore, fluid pressure monitoring devices have been herein disclosed which are capable of constantly monitoring the pressure of a fluid in a line and sensing any decrease in such pressure below a predetermined minimum level, a function clearly advantageously usable where the maintenance of pressurized fluid above a predetermined minimum pressure is essential. Furthermore, the basic principles of the fluid pressure monitoring devices herein disclosed have been illustrated as readily adaptable for various forms of sensing arrangements including mechanically actuated switches, proximity sensors and auxiliary fluid flow detectors, any of which may provide sensing signals for performing auxiliary functions. At the same time, as clearly described, the fluid pressure monitoring principles of the present invention may be readily applied to both stationary and moving pressure monitoring situations and will function in effective and positive manners.

We claim:

1. In a fluid pressure monitoring device for a machine and the like, the combination of: a machine moving part movable in a preset path of movement; a machine stationary part aligned adjacent said preset path of movement; a housing; a main fluid chamber formed in said housing; a plunger in said main fluid chamber reciprocal between first and second positions; operating fluid supply means communicating into said main fluid chamber and directing operating fluid against said plunger tending to urge said plunger toward said first position, said operating fluid normally being under a pressure above a predetermined minimum operating pressure exerting at least a part of a minimum total pressure force against said plunger retaining said plunger in said first position; monitoring pressure means operably connected to said plunger exerting a monitoring total pressure force against said plunger slightly less than said minimum total pressure force tending to urge said plunger toward said second position, said monitoring pressure means moving said plunger toward and into said second position when said pressure of said operating fluid drops below said predetermined minimum operating pressure; sensing means for sensing said plunger movement from said first toward said second position when said sensing means and said housing are generally adjacent, said sensing means including proximity sensor means spaced at all times from said plunger, said proximity sensor means being in a first condition when said plunger is in said first position and converting to a second condition during and after movement of said plunger from said first position into said second position upon said proximity sensor means and said housing becoming generally adjacent; said housing and said proximity sensor means being mounted one on said machine moving part moving in said preset path of movement with said machine moving part and one on said machine stationary part aligned adjacent said preset path of movement of said machine moving part, said proximity sensor means sensing said plunger movement into said second position and converting into said second condition when said housing and said proximity sensor means are generally adjacent in said movable machine part movement.

2. In a fluid pressure monitoring device as defined in claim 1 in which by-pass means is operably connected to said housing main fluid chamber for directing a certain portion of said operating fluid from said main fluid chamber when open, said by-pass means being closed when said plunger is in said first position and being opened during movement of said plunger from said first position toward and into said second position.

3. In a fluid pressure monitoring device as defined in claim 1 in which said monitoring pressure means includes a spring in said housing operably connected to said plunger exerting a certain part of said monitoring total pressure force against said plunger tending to urge said plunger toward and into said second position.

4. In a fluid pressure monitoring device as defined in claim 1 in which said operating fluid of said operating fluid supply means is a liquid such as oil.

5. In a fluid pressure monitoring device as defined in claim 1 in which said plunger in said housing includes a plunger part extending through a housing wall of said main fluid chamber movable to a retracted position when said plunger is in said first position and an extended position when said plunger is in said second position; in which by-pass means is formed through said housing main fluid chamber wall adjacent said plunger part for exhausting a certain part of said operating fluid from said main fluid chamber when opened; and in which sealing means is operably connected to said plunger part closing off said by-pass means when said plunger part is in said retracted position and opening said by-pass means when said plunger part is moved from said retracted position toward said extended position.

6. In a fluid pressure monitoring device as defined in claim 1 in which said plunger in said housing includes a part extending through a housing wall of said main fluid chamber movable between a retracted position when said plunger is in said first position and an extended position when said plunger is in said second position; and in which said proximity sensor means is spaced at all times from said plunger part, said proximity sensor means being in said first condition when said plunger part is in said retracted position, said proximity sensor means being altered to said second condition during movement of said plunger part from said retracted toward and into said extended position upon said proximity sensor means and said plunger part becoming generally adjacent in said movable machine part movement.

7. In a fluid pressure monitoring device as defined in claim 1 in which said operating fluid of said operating fluid supply means is a liquid such as oil under pressure; in which said plunger in said housing includes a plunger part extending through a housing wall of said main fluid chamber movable to a retracted position when said plunger is in said first position and an extended position when said plunger is in said second position; in which by-pass means is formed through said housing main fluid chamber wall adjacent said plunger part for exhausting a certain part of said operating liquid from said main fluid chamber when opened; and in which sealing means is operably connected to said plunger part closing off said by-pass means when said plunger part is in said retracted position and opening said by-pass means when said plunger part is moved from said retracted position toward said extended position.

8. In a fluid pressure monitoring device as defined in claim 1 in which said housing is mounted on said machine moving part moving in said preset path of movement and said proximity sensor means is mounted on said machine stationary part aligned adjacent said preset path of movement; and in which said proximity sensor means senses said plunger movement when said housing is moved generally adjacent said proximity sensor means in said preset path of movement.

* * * * *